United States Patent [19]

Elliott

[11] Patent Number: 5,291,325

[45] Date of Patent: Mar. 1, 1994

[54] REMOTE CONTROL UNIT WITH UNITARY CRYSTAL AND BUTTON

[75] Inventor: Charles A. Elliott, Greenwood, Ind.

[73] Assignee: Thomson Consumer Electronics, Inc., Indianapolis, Ind.

[21] Appl. No.: 807,370

[22] Filed: Dec. 13, 1991

[51] Int. Cl.⁵ .............................................. H04B 10/04
[52] U.S. Cl. .................................... 359/142; 455/92
[58] Field of Search ...................... 359/142, 146, 159; 455/128, 192; 358/194.1

[56] References Cited

U.S. PATENT DOCUMENTS 4,809,360  2/1989  Kraft ................................. 359/142

FOREIGN PATENT DOCUMENTS

| 0094248 | 6/1983 | Japan | 359/142 |
|---|---|---|---|
| 0271532 | 11/1987 | Japan | 359/142 |
| 0036615 | 2/1988 | Japan | 359/142 |
| 0084329 | 4/1988 | Japan | 359/142 |
| 0302692 | 12/1988 | Japan | 359/142 |
| 0068098 | 3/1989 | Japan | 359/142 |
| 0103397 | 4/1989 | Japan | 359/142 |
| 0187632 | 8/1991 | Japan | 359/142 |
| 3296331 | 12/1991 | Japan | 359/142 |

*Primary Examiner*—Leslie Pascal
*Attorney, Agent, or Firm*—Joseph S. Tripoli; Peter M. Emanuel; Frederick A. Wein

[57] ABSTRACT

A simplified and compact remote control unit is presented. A light transmissive crystal, mounted to the housing, is unitary with one of the operative buttons with a flexible hinge therebetween so that a portion of the crystal serves as at least one of the operative buttons.

6 Claims, 2 Drawing Sheets

REMOTE CONTROL UNIT WITH UNITARY CRYSTAL AND BUTTON

BACKGROUND OF THE INVENTION

The present invention relates to remote control units, and more particularly, to remote control units which have simplified operation and are compact.

Many devices, such as television receivers, VCR's, radios and compact disc players, are available which can be remotely controlled by the user. Often the remote control units for such devices can be overly complicated for many users, e.g., a proliferation of buttons, as well as being bulky, especially if many buttons are used. Accordingly, it is desirable to provide a remote control unit which has a simplified operation and is more compact.

SUMMARY OF THE INVENTION

The present invention relates to a simplified and more compact remote control unit. A light transmissive crystal secured in the housing is unitary with one of the operative buttons with a flexible hinge therebetween so that a portion of the crystal serves to be at least one of the operative buttons.

BRIEF DESCRIPTION OF THE DRAWINGS

Reference may be had to the drawings wherein.

DETAILED DESCRIPTION OF THE PREFERRED EMBODIMENT

The present invention is a simplified and more compact remote control unit for a television receiver or the like such as for VCR's, compact disc players, radios, and audio cassette recorders/players.

A remote control comprises a means for communicating with the external responsive device which is to be controlled. The most common mode of communication uses infrared (IR) light such as emitted from a LED (light emitting diode). However, other forms of communication have been used, e.g., sound and radio transmission. Typically, functional commands, as selected by the actuation of relevant buttons, are scanned under the control of a microprocessor, an address signal is generated which allows a readout from memory of the code for communicating the immediate command. A transmitter section transmits signals of the proper frequency to the external controlled device. If a continuous wave format is used, a pulse burst period is selected. If a gated carrier format is used, pulse width, pulse repetition rate, word length and format, etc. are selected to cause the external device to execute the command selected by the user. The format used, and the system and method for generating the communications signal form no part of the present invention. Any appropriate format and electronics circuitry can be used, e.g., that shown in U.S. Pat. No. 4,769,643 of Sogame. As used herein, the term "light" includes electromagnetic wavelengths extending from ultraviolet to the far infrared.

Figures 1A, 1B:
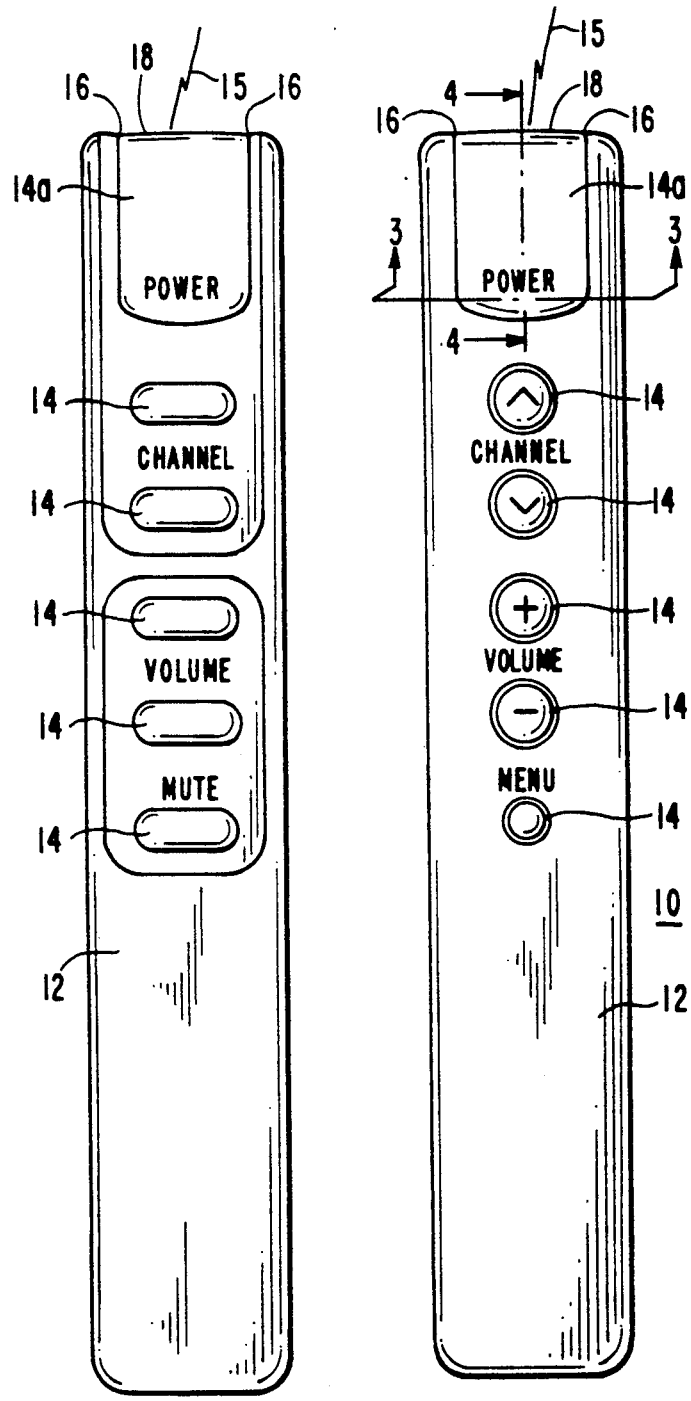
FIGS. 1a and 1b show an elevational views of a remote control unit according to aspects of the present invention.

Referring to the Figures, there is shown a remote control transmitter unit, generally designated 10, having a light opaque housing 12, and a plurality of actuation buttons 14, 14a, which in the exemplary embodiment control channel up and down, volume up and down, menu (FIG. 1a), mute (FIG. 1b), and power on-off. In response to the user mechanically depressing one of the buttons, a communicating radiant light signal 15 is generated by LED 17 as determined by electronic circuitry (not shown) such as discussed above, and exits the housing 12 in an aimed direction through a window 16 which is an aperture in opaque housing 12. Window 16 is covered by a crystal 18, which in the exemplary embodiment is made of a light transmissive plastic, through which the generated light signal passes. Crystal 18 may appear colored, and either translucent or transparent when viewed in visible light. In any event, crystal 18 light frequency used for the communicating signal. It is desirable that the light emitting axis of the LED 17 be generally orthogonal to the plane of the body of crystal 18 so that there is little or no bending of the light beam due to the index of refraction of crystal 18 at the light frequency of the communicating signal. However, it is within the contemplation of the present invention that crystal 18 can also serve as a lens for focussing off-axis radiant light energy emitted by the LED.

Figure 3:
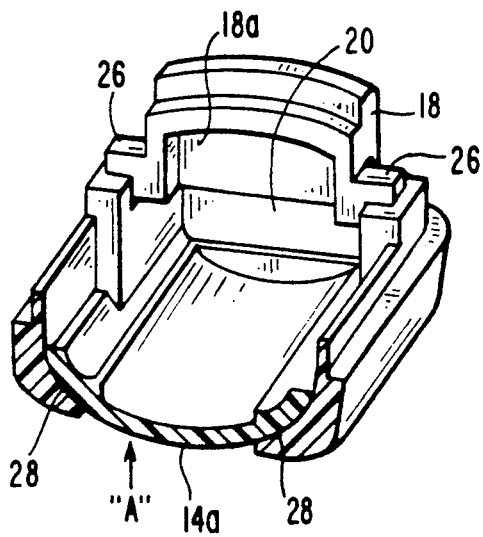
FIG. 3 shows a partial cut-away view along line 3—3 of FIG. 1.
Figure 4:
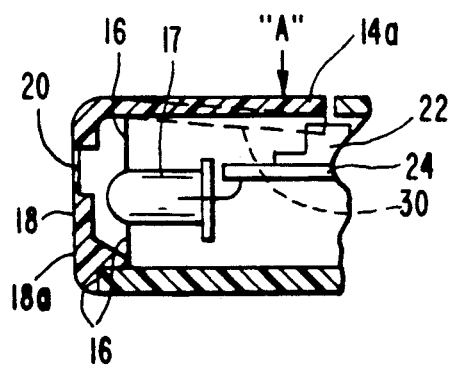
FIGS. 4 and 5 show partial cross-sectional views along line 4—4, 5—5 of FIG. 1 showing different embodiments of the remote control unit and the motion of the unitary button.
Figure 5:
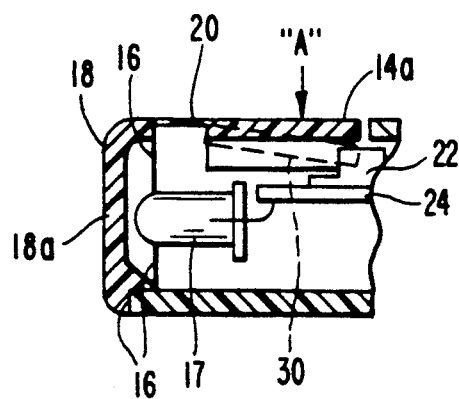

According to aspects of the present invention, the light transmissive crystal 18 also forms at least one of the actuating buttons 14. In the exemplary embodiment, a unitary portion of crystal 18 also provides the "power" on-off actuated button 14a. Button 14a is unitary with a light transmissive portion 18a of crystal 18 through a flexible hinge 20 formed by a thin-walled portion of crystal 18. Two embodiments of flexible hinge 20 are shown in FIGS. 4 and 5 wherein hinge 20 is disposed within the light transmissive portion 18a of crystal 18 (FIG. 4) and disposed within button portion 14a (FIG. 5). In either case, button portion 14a is movable in direction "A" as shown in FIGS. 3-5 to actuate switch 22. Switch 22 is mounted on printed circuit board 24 upon which LED 17, the associated electronic circuitry (not shown), and other buttons 14 are also mounted.

Figure 2:
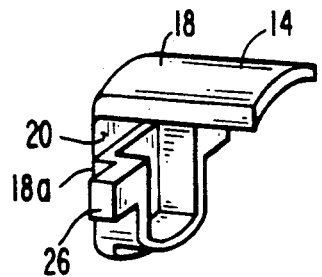
FIG. 2 is an isometric view of the light transmissive crystal and unitary button shown in FIG. 1.

FIG. 2 shows an isometric view of crystal 18 having integral button portion 14a and light transmissive portion 18a. Crystal 18 is also provided with a pair of mounting tabs 26 disposed on diametrically opposite sides for securely mounting crystal 18 to housing 12 as shown in FIG. 3. When the upper and lower halves of housing 12 are assembled together, tabs 26 rigidly support light transmissive portion 18a to the housing and with respect to LED 17. It should be noted that button portion 14a is provided with a ridge 28 for providing a return "stop" against of button portion 14a against abuttable surfaces of housing 12. The deflection of button portion 14a in the direction "A" for the two embodiments of the position of flexible hinge 20 is shown in FIGS. 4 and 5 in phantom at 30 with the corresponding movement of switch 22 shown in phantom at 22a.

Thus, there is shown a remote control wherein one of the buttons is unitary with the light signal transmissive crystal through a flexible hinge portion so as to provide improved simplicity for the buttons and a more compact control unit. The present embodiment shows the power button as unitary with the crystal since this button does not require a complementary function button for commands in an opposite direction, such as the channel and volume controls. However, if desired, button portion 14a can be split along the longitudinal axis with each branch actuating a respective switch 22 mounted on printed circuit board 24 so that a command requiring complementary function buttons can be accomodated.

What is claimed is:

1. A remote control unit for remotely controlling an external responsive device comprising:
   a housing,
   a light generating means disposed within the housing for producing radiant light in the electromagnetic spectrum extending from the ultraviolet to the far infrared for communication with the external responsive device,
   a plurality of buttons movable with respect to the housing for user actuation of the light generating means by external mechanical pressure applied to at least one of the buttons,
   a window means disposed in the housing for passage therethrough of radiant light produced by the light generating means, and
   a light transmissive means having a first portion covering the window means and disposed over the window for passing through radiant light, and having a second portion unitary with the first portion with the first and second portions being joined by a flexible portion so that the first and second portions are flexibly movable with respect to each other, said second portion comprising at least one of the plurality of buttons.

2. The remote control unit of claim 1 wherein the light transmissive means comprises a lens which focuses the light.

3. The remote control unit of claim 1 wherein the first and second portions of the light transmissive means are generally orthogonal to each other and further comprise a flexible portion disposed within the first portion.

4. The remote control unit of claim 1 wherein the first and second portions of the light transmissive means are generally orthogonal to each other and further comprise a flexible portion disposed within the second portion.

5. A remote control unit comprising a light transmissive crystal for transmitting light generated by a light generating means and at least one of a plurality of actuation button for actuation of the light generating means, the light transmissive crystal and one of the buttons being unitary.

6. A remote control unit comprising a light transmissive crystal for transmitting light generated by a light generating means and at least one button for actuation of the light generating means, the light transmissive crystal and one of the at least one buttons being flexibly secured to each other.

* * * * *